US012498095B2

United States Patent
Sabatini et al.

(10) Patent No.: US 12,498,095 B2
(45) Date of Patent: Dec. 16, 2025

(54) VEHICLE LIGHTING ASSEMBLY WITH THREE-DIMENSIONAL LUMINESCENT STRUCTURE

(71) Applicant: Autosystems, a Division of Magna Exteriors Inc., Aurora (CA)

(72) Inventors: Gabriele Wayne Sabatini, Newmarket (CA); Traian Miu, Newmarket (CA)

(73) Assignee: Autosystems, a division of Magna Exteriors Inc., Aurora (CA)

( * ) Notice: Subject to any disclaimer, the term of this patent is extended or adjusted under 35 U.S.C. 154(b) by 0 days.

(21) Appl. No.: 18/802,044

(22) Filed: Aug. 13, 2024

(65) Prior Publication Data

US 2025/0067412 A1 Feb. 27, 2025

Related U.S. Application Data

(60) Provisional application No. 63/534,253, filed on Aug. 23, 2023.

(51) Int. Cl.
*F21S 43/16* (2018.01)
*F21S 41/176* (2018.01)
*F21S 43/14* (2018.01)

(52) U.S. Cl.
CPC ............ *F21S 43/16* (2018.01); *F21S 41/176* (2018.01); *F21S 43/14* (2018.01)

(58) Field of Classification Search
CPC ..... F21S 41/176; F21S 43/14; F21S 43/16–33
See application file for complete search history.

(56) References Cited

U.S. PATENT DOCUMENTS

| | | |
|---|---|---|
| 9,441,811 B2 | 9/2016 | Lamvik et al. |
| 9,664,354 B1 | 5/2017 | Dellock et al. |
| 10,031,272 B2 * | 7/2018 | An ..................... G02B 6/0023 |
| 10,161,573 B2 * | 12/2018 | Gawel ..................... A63F 13/25 |
| 10,240,737 B2 | 3/2019 | Salter et al. |
| 10,310,156 B2 | 6/2019 | Cardullo |
| 10,821,884 B1 | 11/2020 | Johnson et al. |
| 2013/0215597 A1 | 8/2013 | Davis |

(Continued)

FOREIGN PATENT DOCUMENTS

| | | |
|---|---|---|
| EP | 4253828 A1 | 10/2023 |
| EP | 4253830 A1 | 10/2023 |

(Continued)

*Primary Examiner* — Jason M Han
(74) *Attorney, Agent, or Firm* — Dickinson Wright PLLC

(57) ABSTRACT

A lighting assembly for a vehicle includes: an illumination source configured to emit light having a first wavelength, a housing defining a chamber, and a three-dimensional (3D) luminescent structure located in the chamber. The 3D luminescent structure includes a photoluminescence material configured to emit visible light having at least one second wavelength different from the first wavelength and in response to excitation by the light having the first wavelength. A lighting element for a vehicle includes a flat panel and a support structure holding the flat panel at a fixed position. The flat panel includes a photoluminescence material configured to emit visible light in response to an excitation by light having a wavelength different from the visible light. The support structure appears unilluminated to present an effect wherein the flat panel appears to float in space.

9 Claims, 17 Drawing Sheets

(56) References Cited

U.S. PATENT DOCUMENTS

| | | |
|---|---|---|
| 2013/0215599 A1 | 8/2013 | Davis et al. |
| 2015/0338064 A1 | 11/2015 | Ishino |
| 2020/0263846 A1 | 8/2020 | Miu |
| 2020/0273385 A1 | 8/2020 | O'Hara |
| 2022/0206344 A1 | 6/2022 | Ishino |
| 2022/0299184 A1 | 9/2022 | Traian et al. |
| 2023/0125470 A1* | 4/2023 | Sato ............... F21S 43/315 362/516 |
| 2023/0417388 A1 | 12/2023 | Sato |

FOREIGN PATENT DOCUMENTS

| | | |
|---|---|---|
| LU | 102499 B1 | 8/2022 |
| WO | 2011068552 A1 | 6/2011 |
| WO | 2016050517 A1 | 4/2016 |

* cited by examiner

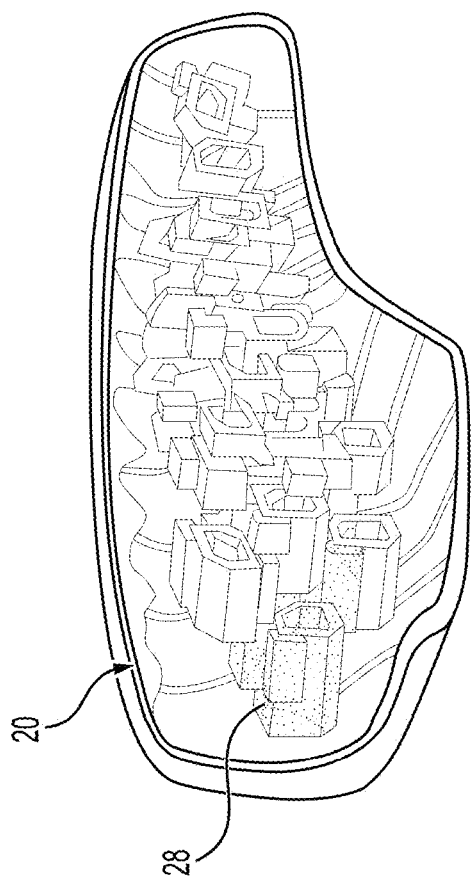
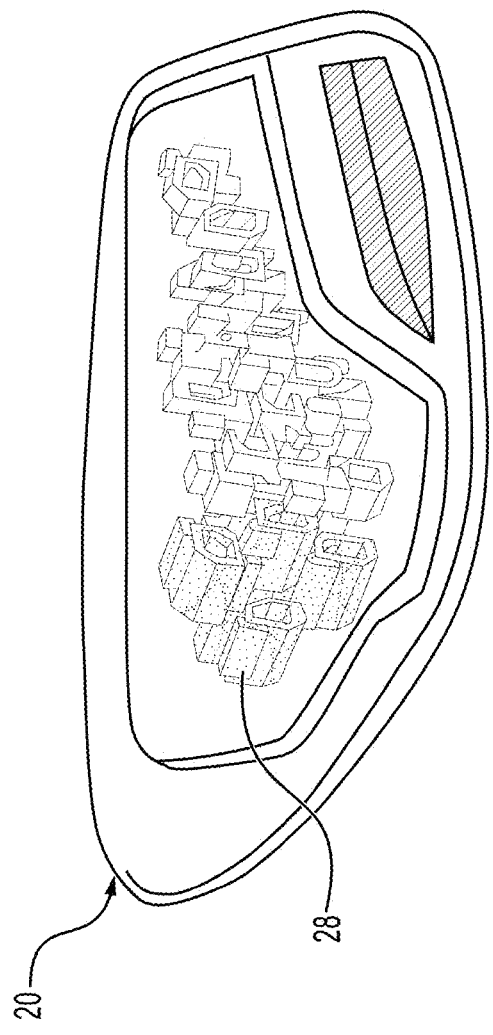

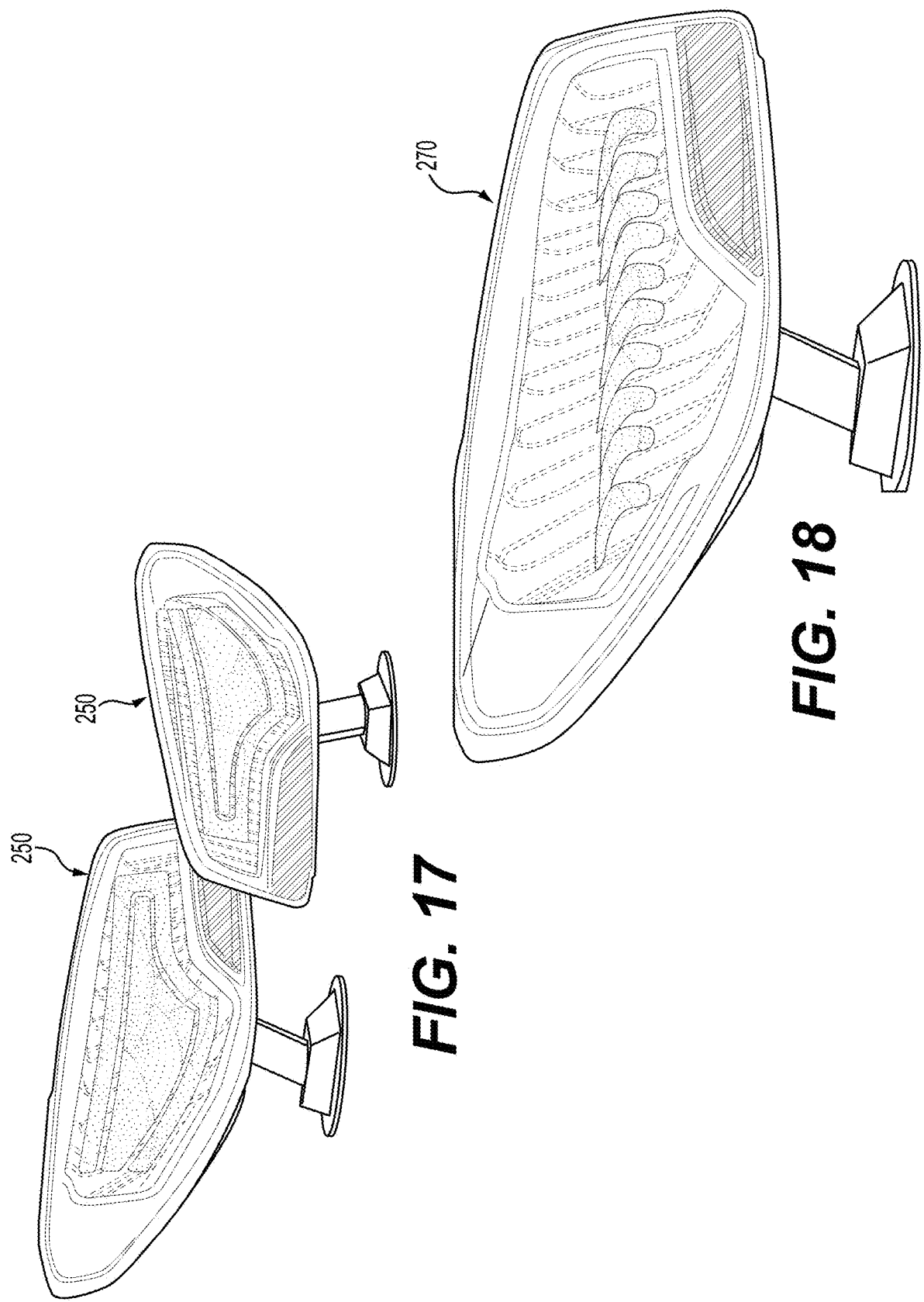

VEHICLE LIGHTING ASSEMBLY WITH THREE-DIMENSIONAL LUMINESCENT STRUCTURE

CROSS REFERENCE TO RELATED APPLICATIONS

This U.S. utility patent application claims the benefit of U.S. Provisional Patent Application No. 63/534,253 filed Aug. 23, 2023, the contents of which is incorporated herein by reference in its entirety.

FIELD

The present disclosure relates to a lighting assembly for a vehicle, such as a headlight or a brake light assembly, and which includes a 3-dimensional (3-D) luminescent structure.

BACKGROUND

This section provides background information related to the present disclosure which is not necessarily prior art.

It is known to employ semiconductor light sources, in particular light emitting diodes (LEDs), in automotive signal lights. For example, tail lights on some vehicles include an array of red light-emitting and/or amber light-emitting LEDs which are positioned between a reflector and a lens to provide the desired signal patterns. It is also known to have signal lamps wherein one or more LEDs are arranged in a direct view wherein the output of the LED passes directly through the lens of the signal light.

While known signal lights employing LEDs provide advantages over signal lights employing incandescent bulbs, they still suffer from some problems. For example, available LEDs emit limited amounts of light relative to incandescent lamps. Due to these lower emitted levels of light and/or the inefficiency of a conventional reflector and lens in transmitting the light produced by the LEDs, a large number of LEDs must often be employed to produce sufficient signal lighting to meet regulatory requirements. Further, this large number of LEDs must be appropriately spaced about the signal light to provide the lighted surface area required to meet regulatory requirements and thus the aesthetic design of such signal lights is limited.

As will be apparent, next to regulatory and safety concerns, aesthetic design can be one of the most significant considerations for the designer of a vehicle and, to date, the range of aesthetic design available for automotive lighting features using semiconductor light sources has been limited.

SUMMARY

This section provides a general summary of the disclosure, and is not a comprehensive disclosure of its full scope or all of its features.

The present disclosure provides a lighting assembly for a vehicle. The lighting assembly includes an illumination source configured to emit light having a first wavelength; a housing defining a chamber; and a three-dimensional (3D) luminescent structure located in the chamber. The 3D luminescent structure includes a photoluminescence material configured to emit visible light having at least one second wavelength different from the first wavelength and in response to excitation by the light having the first wavelength.

In some embodiments, the light having the first wavelength includes ultraviolet light.

In some embodiments, the photoluminescence material includes a quantum dot doped substrate.

In some embodiments, the illumination source includes a light source and a Micro-Electro-Mechanical Systems (MEMS) reflector configured to adjust a reflection of the light having the first wavelength for selectively illuminating one or more portions of the 3D luminescent structure.

In some embodiments, the illumination source includes a plurality of Light Emitting Diodes (LEDs) disposed around the 3D luminescent structure.

In some embodiments, the lighting assembly further includes a support structure holding the 3D luminescent structure at a fixed position within the chamber, and the support structure appears unilluminated to present an effect wherein the 3D luminescent structure appears to float in space within the chamber.

In some embodiments, the lighting assembly is a headlight assembly configured to be mounted on a front of the vehicle.

In some embodiments, the lighting assembly is a taillight assembly configured to be mounted on a rear of the vehicle.

In some embodiments, the illumination source is configured to cause the 3D luminescent structure to present a signaling illumination including at least one of a turn signal indicator and a brake indicator.

In some embodiments, the 3D luminescent structure includes a plurality of independent structural elements.

In some embodiments, the plurality of independent structural elements include flat panels.

In some embodiments, the flat panels of the plurality of independent structural elements are each either edge lit or back lit by the illumination source.

The present disclosure also provides a lighting element for a vehicle. The lighting element includes: a flat panel including a photoluminescence material configured to emit visible light in response to an excitation by light having a wavelength different from the visible light; and a support structure holding the flat panel at a fixed position, wherein the support structure appears unilluminated to present an effect wherein the flat panel appears to float in space.

In some embodiments, the light having the wavelength different from the visible light includes ultraviolet light.

In some embodiments, the photoluminescence material includes a quantum dot doped substrate.

In some embodiments, the flat panel includes a stack of layers extending parallel to one another. The stack of layers includes a standard mirror, a light pipe overlying the standard mirror, a q-dot panel including quantum dots and overlying the light pipe, and a dichroic mirror overlying the q-dot panel.

In some embodiments, the lighting element further includes an LED disposed adjacent to an edge of the flat panel and configured to direct the light having the wavelength different from the visible light into the light pipe.

In some embodiments, the flat panel includes a stack of layers extending parallel to one another. The stack of layers includes a first dichroic mirror, a q-dot panel including quantum dots and overlying the first dichroic mirror, and a second dichroic mirror overlying the q-dot panel.

In some embodiments, the lighting element further includes a plurality of LEDs disposed behind the first dichroic mirror and configured to backlight the flat panel with the light having the wavelength different from the visible light.

In some embodiments, the stack of layers of the flat panel further includes a diffuser layer disposed between the first dichroic mirror and the q-dot panel.

In accordance with a further aspect, a lighting assembly for a vehicle includes an excitation source configured to emit an excitation beam, a housing defining a chamber, and a three-dimensional (3D) luminescent structure located in the chamber and including a photoluminescence material configured to emit visible light in response to excitation by the excitation beam, where the excitation source is adapted to direct the excitation beam on at least a portion of the three-dimensional (3D) luminescent structure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 9 shows a photo of the first lighting assembly with the 3D luminescent structure substantially entirely illuminated;

FIG. 10 shows a photo of the first lighting assembly with the 3D luminescent structure partially illuminated;

FIG. 17 shows a front view of two fourth taillight assemblies, in accordance with an aspect of the present disclosure;

FIG. 18 shows a front view of a fifth lighting assembly, in accordance with an aspect of the present disclosure;

Corresponding reference numerals indicate corresponding parts throughout the several views of the drawings.

DETAILED DESCRIPTION

Figure 1:
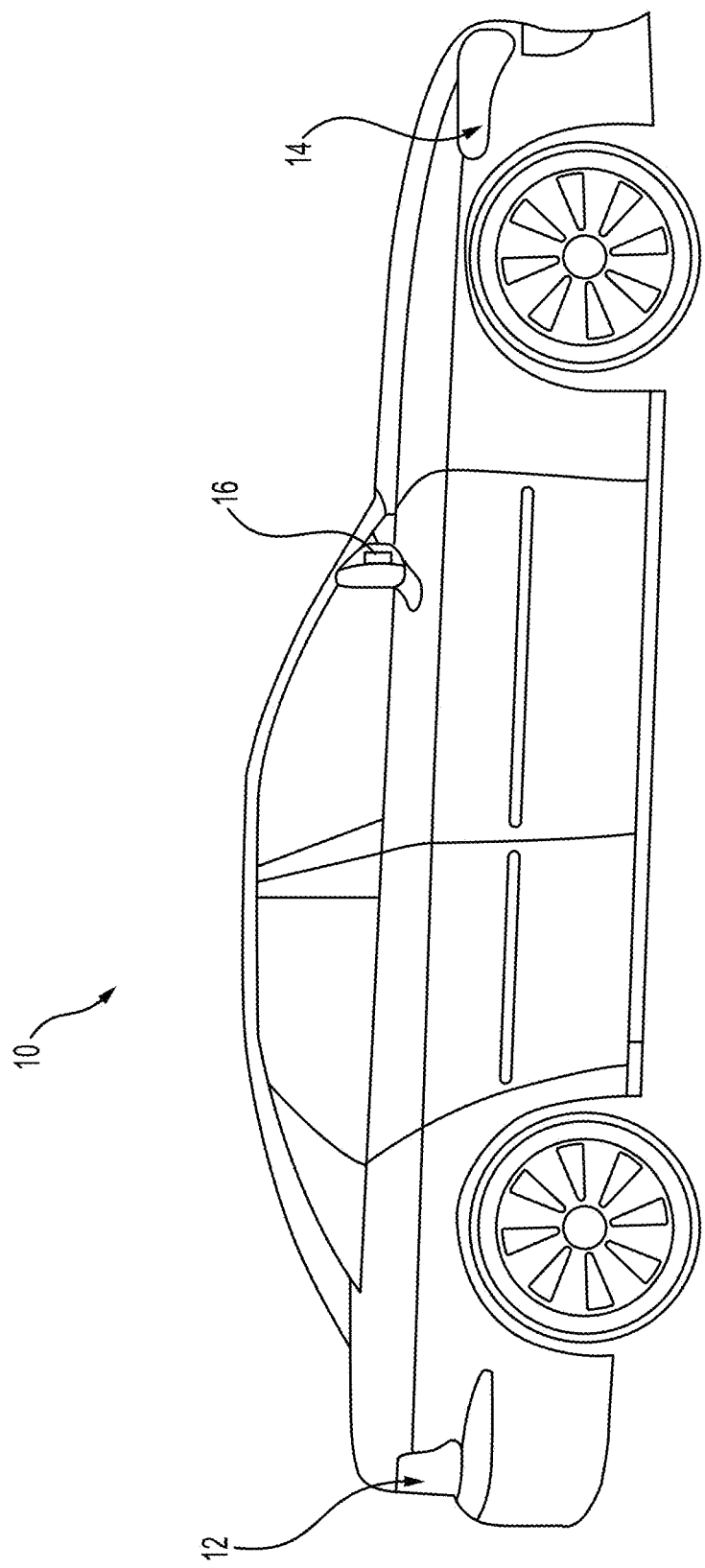
FIG. 1 shows a side view of a vehicle.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It is an objective of the present disclosure to provide a lighting assembly for a vehicle, such as a headlight assembly, a tail light assembly, or a signal light assembly, and which includes one or more lighting elements that provide an enticing graphic appearance. The lighting elements may include a three-dimensional (3D) structure and/or one or more flat panels that appear to float in a 3D space.

The present disclosure provides example embodiments of a lighting assembly for a vehicle. The example embodiments include several different taillight assemblies. However, the principles of the present disclosure may be applied to other vehicle lighting applications, including headlights, front marker lights, side-mounted signal lights, etc.

FIG. 1 shows a side view of a vehicle 10 including a taillight assembly 12, a headlight assembly 14, and a turn signal light 16 of an external rearview mirror.

Figure 2:
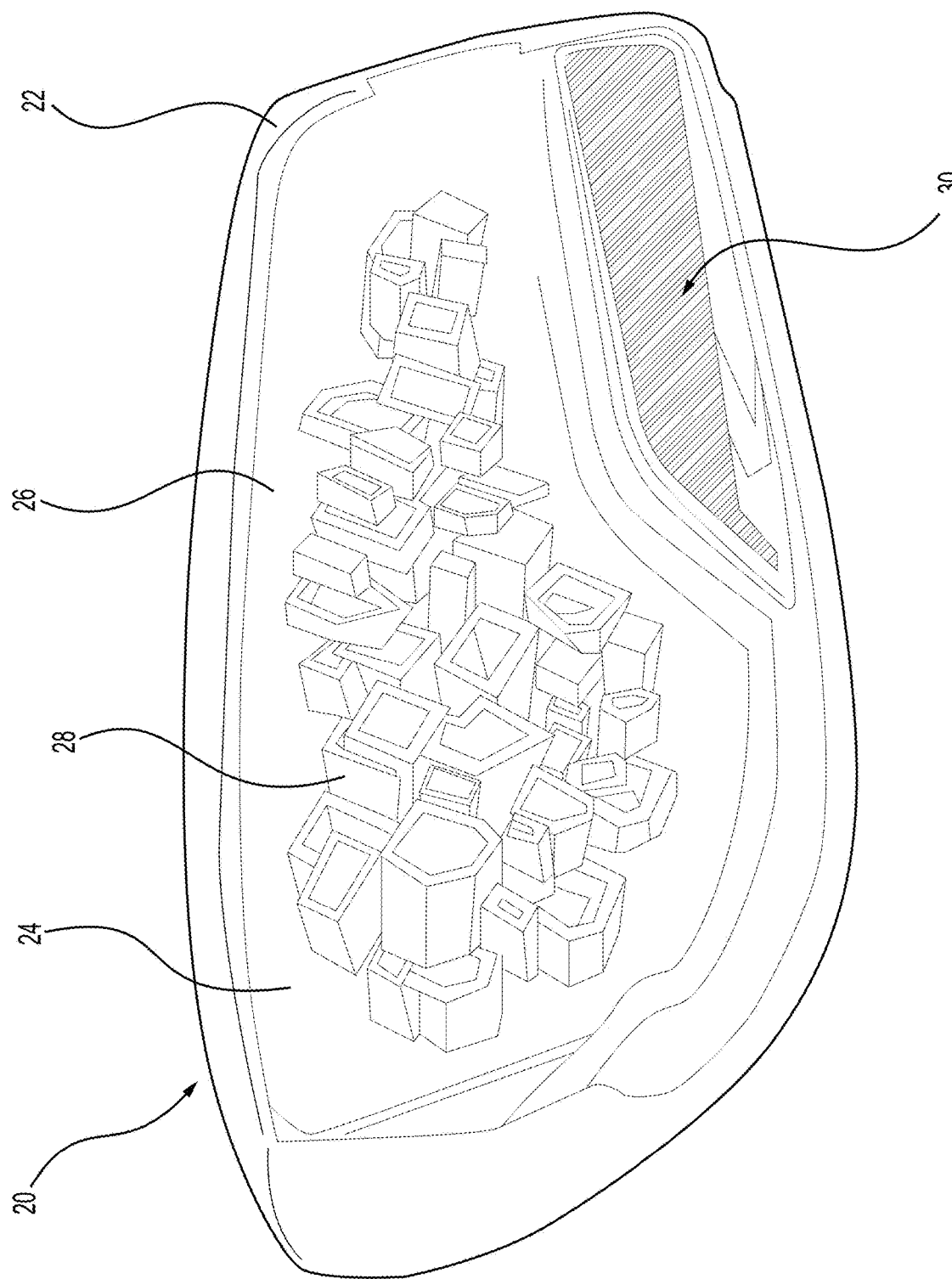
FIG. 2 shows a first lighting assembly, in accordance with an aspect of the present disclosure.
Figure 3:
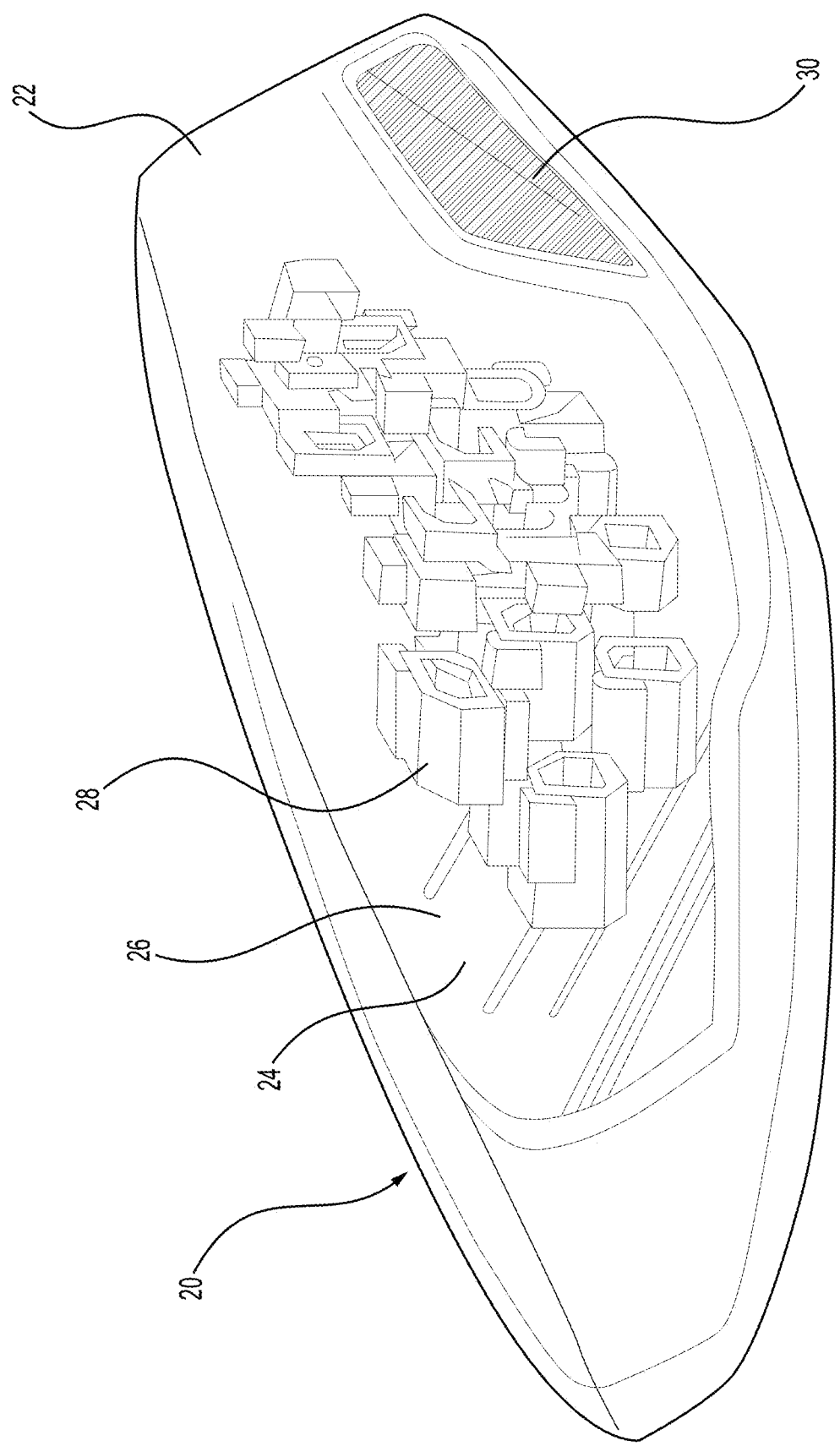
FIG. 3 shows a perspective view of the first lighting assembly.

FIGS. 2-3 show a first lighting assembly 20 for a vehicle, and which are configured as a taillight assembly. However, the principles and components of the first lighting assembly 20 may be used in vehicle lighting assemblies for other purposes and/or locations. In operation as a taillight assembly, the first lighting assembly 20 may provide running lighting for nighttime operation. The first lighting assembly 20 may also provide brake lighting function and one or more other functions, such as turn signal indication and/or an indication of the vehicle being in a reverse gear.

The first lighting assembly 20 includes a housing 22 that defines a chamber 24. A lens 26 of clear material, such as acrylic, encloses the chamber 24 while allowing light to pass therethrough. The lens 26 may be transparent to present a clear view of a three-dimensional structure 28 that is located in the chamber 24. The three-dimensional structure 28 may include a photoluminescence material configured to emit visible light, such as red light, in response to excitation from an illumination source (not shown on FIG. 2).

The first lighting assembly 20 also includes an auxiliary indicator 30 located in the housing and providing an indicator, such as a light, that is independent of the three-dimensional structure 28. The auxiliary indicator 30 shown in FIG. 2 includes a clear lens that may be used as a turn signal indicator and/or a reverse indicator.

Figure 4:
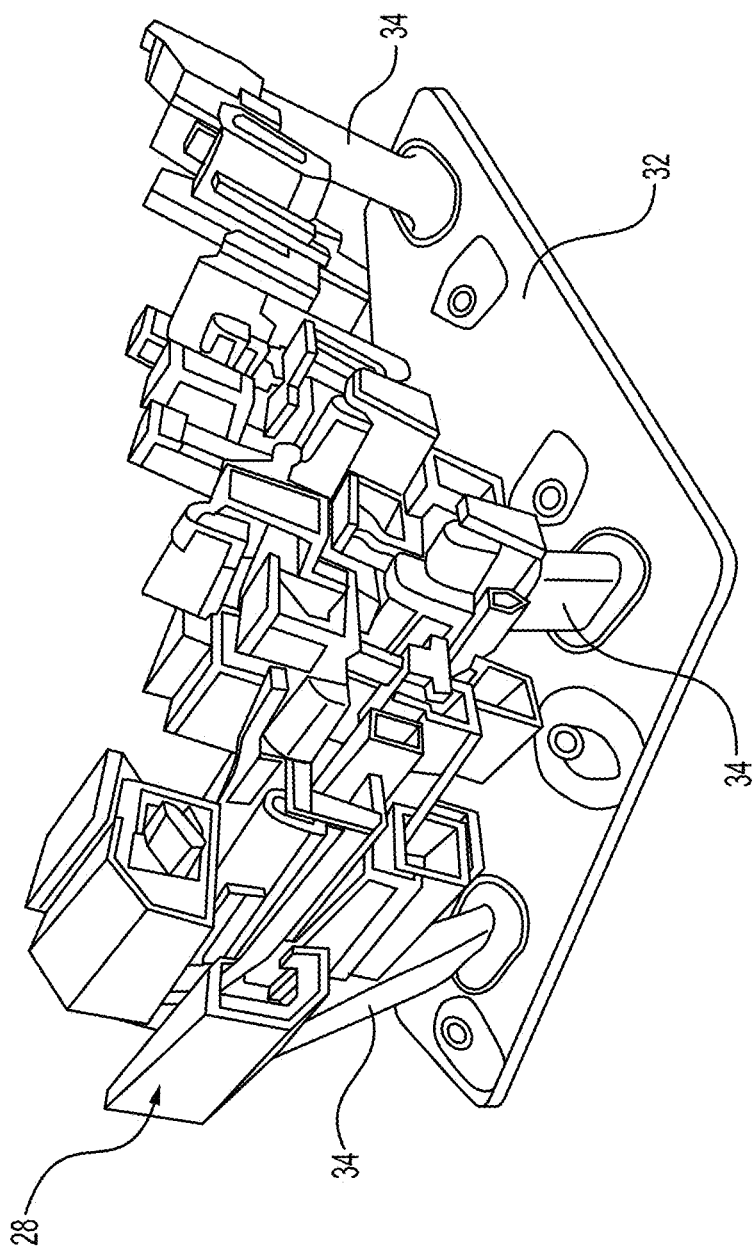
FIG. 4 shows perspective view of a first 3D luminescent structure for the first lighting assembly.

FIG. 4 shows perspective view of a 3D luminescent structure 28 for the first lighting assembly 20. The 3D luminescent structure 28 includes a geometric structure formed from a quantum dot doped substrate that is illuminated by a excitation source to create luminance of the structure. A support structure 32, 34 holds the 3D luminescent structure 28 in a fixed position within the chamber 24. The support structure 32, 34 includes a baseplate 32 configured to attach to the housing 22, and three posts 34 that the 3D luminescent structure 28 to the baseplate 32. The support structure 32, 34 may appear unilluminated to present an effect wherein the three-dimensional structure 28 appears to float in space within the chamber 24.

Figure 5:
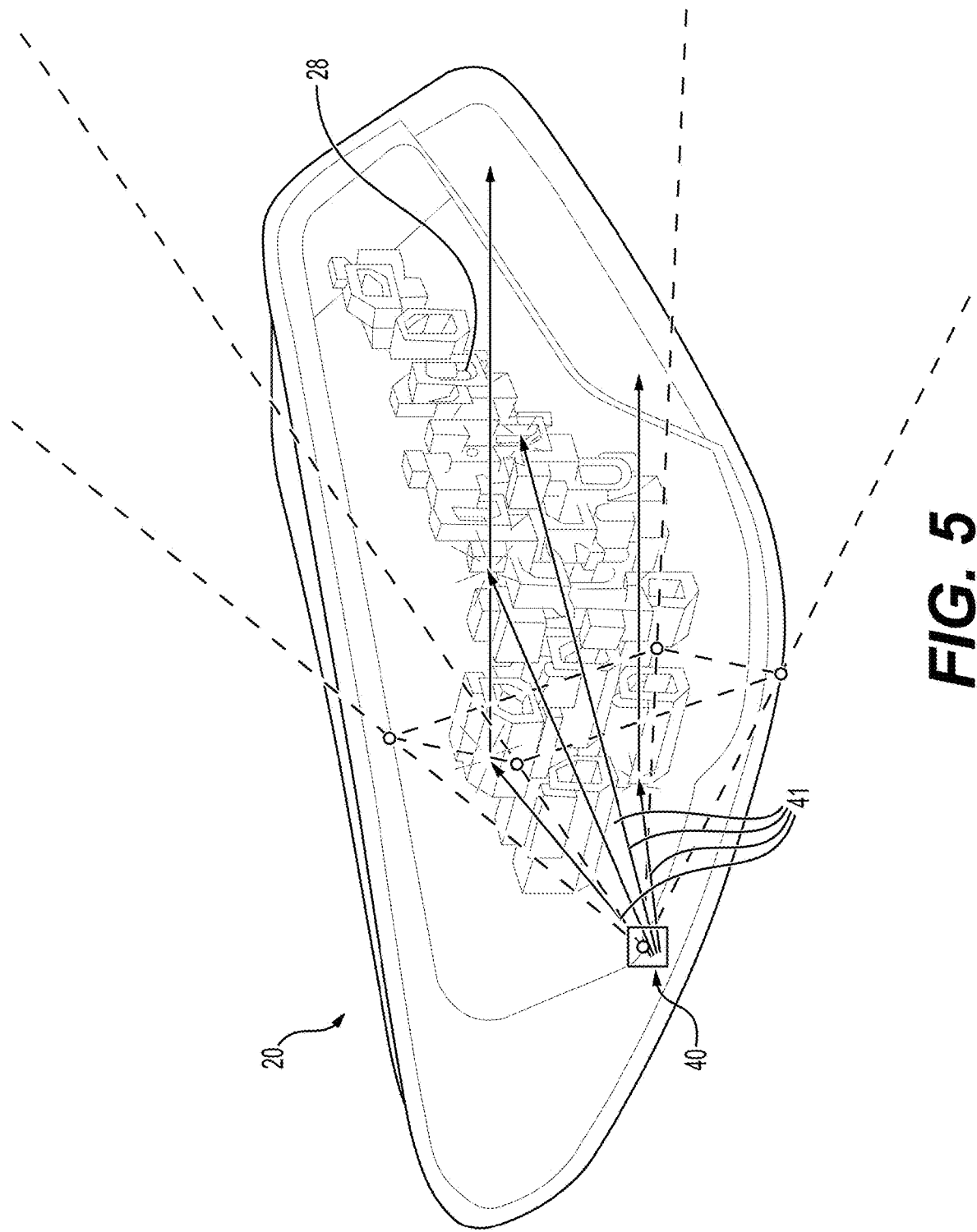
FIG. 5 shows a perspective diagram of the first lighting assembly, in accordance with an aspect of the present disclosure.

FIG. 5 shows a perspective diagram of the first lighting assembly 20 including an illumination source 40, which may also be called an excitation source, configured to emit an excitation beam 41 of light having a first wavelength, and to direct the excitation beam 41 toward one or more portions of 3D luminescent structure 28. The photoluminescence material of the 3D luminescent structure 28 may emit visible light having at least one second wavelength, which different from the first wavelength and in response to excitation by the light having the first wavelength. For example, the illumination source 40 may direct the excitation beam 41 onto all of the three-dimensional structure 28, or only parts of the three-dimensional structure 28. When the excitation beam 41 strikes a local area of the structure, only a portion of the three-dimensional structure 28.will be illuminated. The excitation beam 41 can be directed in different patterns for various illumination sequences.

Figure 6:
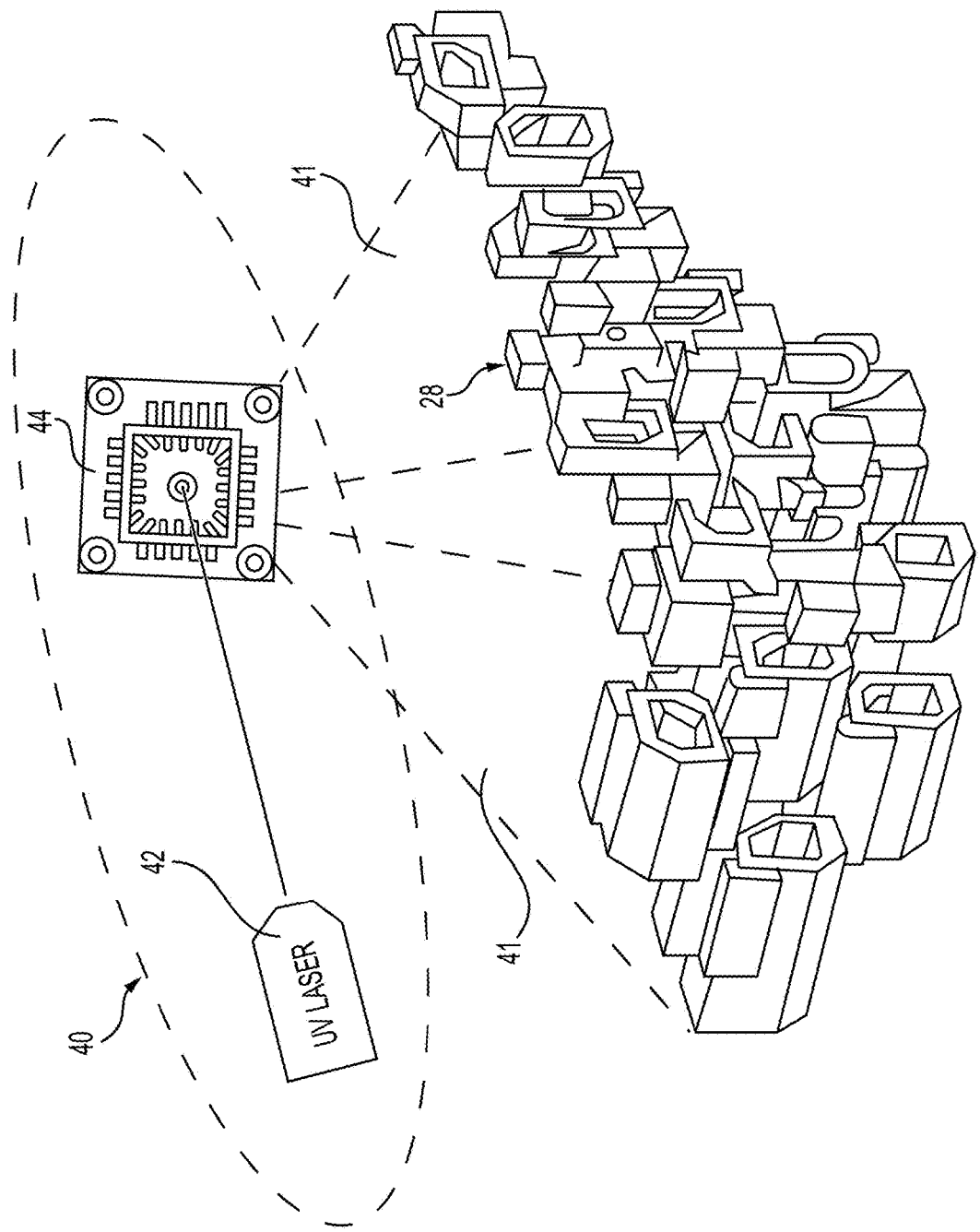
FIG. 6 shows a schematic diagram showing an illumination source in a system for a 3D vehicle lighting assembly, in accordance with an aspect of the present disclosure.

FIG. 6 shows a schematic diagram showing an illumination source 40 in a system for a 3D vehicle lighting assembly, where the illumination source 40 includes a light source 42, and a Micro-Electro-Mechanical Systems (MEMS) reflector 44 configured to dynamically adjust a reflection of the excitation beam 41 for selectively illuminating one or more portions of the three-dimensional structure 28. The MEMS reflector 40 may include any projection technology capable of reflecting the excitation beam 41, which may include UV-A and/or blue light. For example, the MEMS reflector 40 may include a Dielectric-Metal-Dielectric (DMD) device and/or a Liquid Crystal on Silicon (LCOS) device. In some embodiments, and as shown in FIG. 6, the light source 42 includes a ultraviolet (UV) source configured to emit the excitation beam 41 as UV light. For example, in possible configurations the light source 42 may emit all or some of the wavelengths within the UV range of 100 nm to 400 nm. For example, light source 42 may be configured to emit blue light in the wavelength range extending from 430 nm to 490 nm or violet light extends from 380 nm to 440 nm Other subranges of light wavelengths within the UV range are possible. In some embodiments, and as shown in FIG. 6, the light source 42 includes a laser. Additionally or alternatively, the light source 42 may produce blue light. In another possible configuration, light source 42 may be configured to emit violet light excitation having wavelengths illustratively in the range of 380 nm-410 nm. Such a violent light excitation light source 42 may be utilized in combination with the 3D luminescent structure 28 configured using Cd-free InP quantum dot materials for example which are intended for high absorbance of violet light excitation.

The light source 42 may have its excitation beam 41 steered onto different parts of the three-dimensional structure 28 for certain periods of time. A rapid steering could cycle through illumination of separate portions of the three-dimensional structure 28 to provide an appearance that an entirety of the three-dimensional structure 28 is continuously illuminated Quantum dots, also called q-dots, in the three-dimensional structure 28 can enable a unique 3D lighting experience that cannot be achieved with conventional lighting technologies. Using laser projection together with Q-dots may allow for more complex lighting patterns of the Q-dot material for additional styling and lighting functions. Animated lighting visual cues can further enhance styling freedom by accentuating signature styling elements that include the Q-dots.

Figure 7:
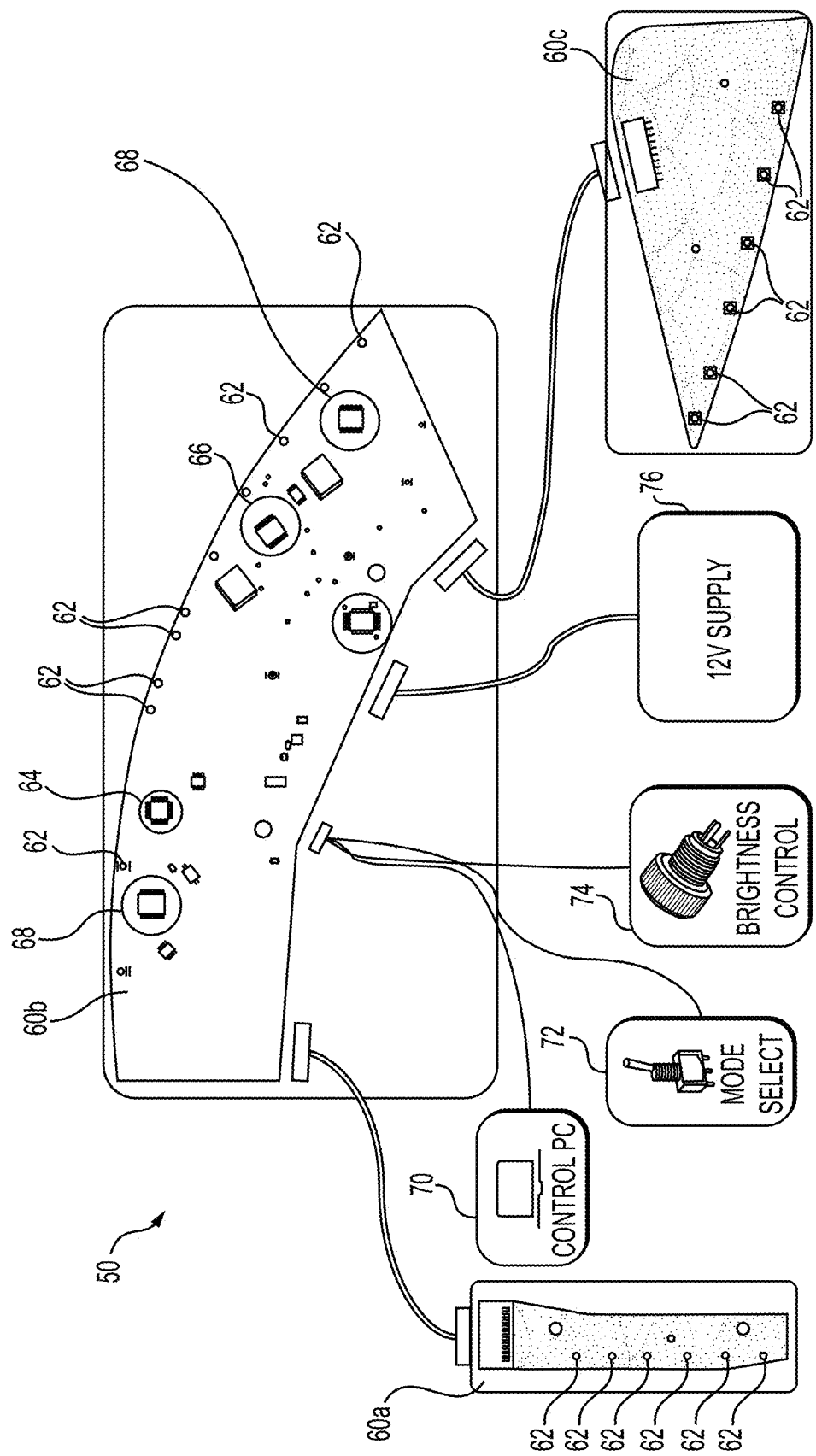
FIG. 7 shows a schematic diagram of a system for a 3D vehicle lighting assembly, in accordance with an aspect of the present disclosure.

FIG. 7 shows a schematic diagram of a system 50 for a 3D vehicle lighting assembly. The system 50 includes a plurality of circuit boards 60a, 60b, 60c including a left board 60a, a top board 60b, and a right board 60c, which may each be located at a corresponding side the three-dimensional structure 28 in an installed configuration. The 60a, 60b, 60c are all in functional communication via one or more wiring harnesses. Each of the circuit boards 60a, 60b, 60c includes a plurality of light emitting diodes (LEDs) 62, such as blue or UV LEDs configured to produce the excitation beams 41.

The top board 60b includes a microcontroller 64, an LED driver 66, and a plurality of pixel controllers 68. Together, the microcontroller 64, LED driver 66, and pixel controllers 68 control operation of the LEDs 62 for selectively illuminating various regions of the three-dimensional structure 28.

In some embodiments, and as shown in FIG. 7, the system 50 includes a control computer 70, such as an electronic control unit (ECU) on the vehicle. In some embodiments, and as shown in FIG. 7, the system 50 includes one or more user controls 72, 74, such as a mode select switch 72 and/or a brightness control knob 74 for controlling various operating characteristics of the system 50. The top board 60b receives power from a 12-Volt (12V) supply 76 and distributes power to the other circuit boards 60a, 60c.

Figure 8:
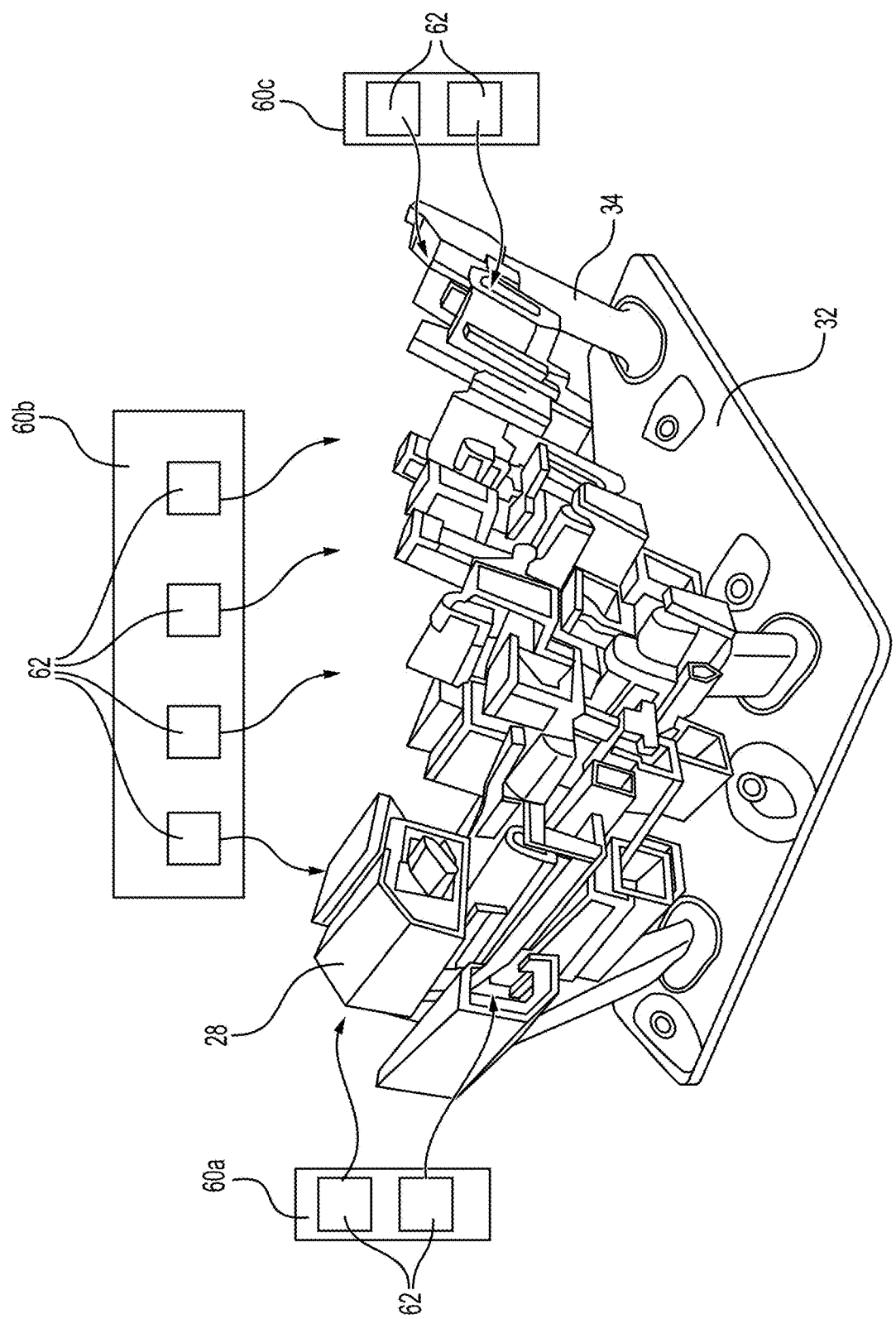
FIG. 8 shows a perspective view of a the 3D luminescent structure, with a schematic block diagram indicating various lighting sources disposed thereabout, in accordance with an aspect of the present disclosure.

FIG. 8 shows a perspective view of a first 3D luminescent structure 28, with a schematic block diagram indicating various lighting sources disposed thereabout. The LEDs 62 may be positioned at various different angles to ensure UV light is received by various corresponding portions of the 3D luminescent structure 28.

FIG. 9 shows a photo of the first lighting assembly 20, with the 3D luminescent structure 28 substantially entirely illuminated. FIG. 10 shows a photo of the first lighting assembly 20 with the 3D luminescent structure 28 partially illuminated.

Figure 11:
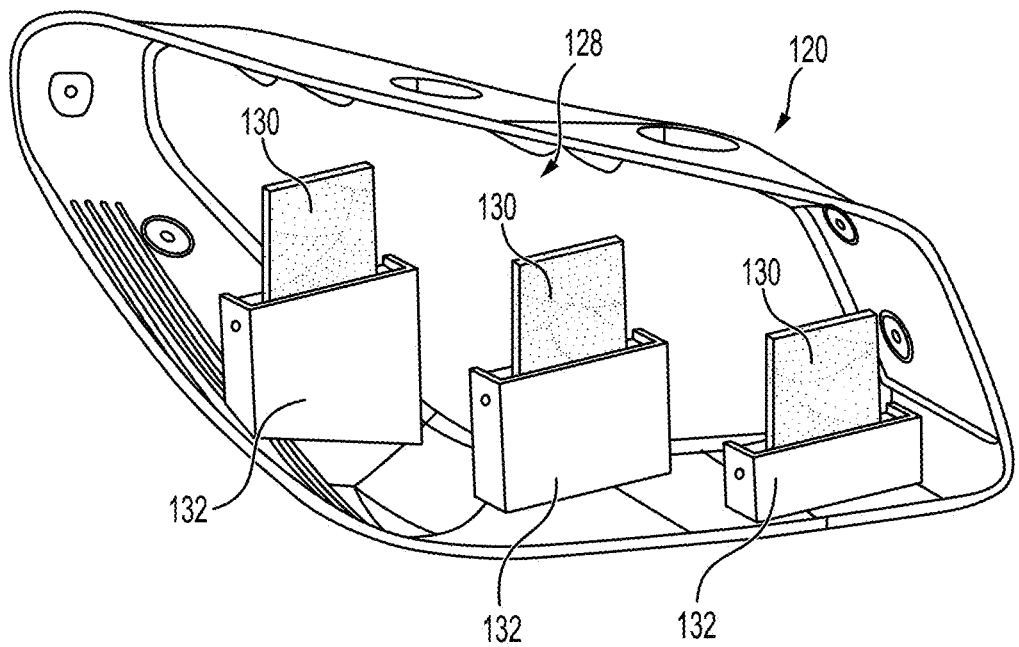
FIG. 11 shows a partial cut-away diagram of second lighting assembly illustrating internal structure thereof, in accordance with an aspect of the present disclosure.

FIG. 11 shows a partial cut-away diagram of a second lighting assembly 120 illustrating internal structure thereof. The second lighting assembly 120 includes a second 3D luminescent structure 128 comprising several independent structural elements 128 each including a flat panel 130 including a luminescent material. The flat panels 130 of the second lighting assembly 120 are arranged as stacked pedals that are spaced apart from one another across a width of the second 3D luminescent structure 128, and at varying depths. The flat panels 130 of the second lighting assembly 120 may be independently illuminated, providing for a sequential turn signal function or for a brake light function.

Figure 12:
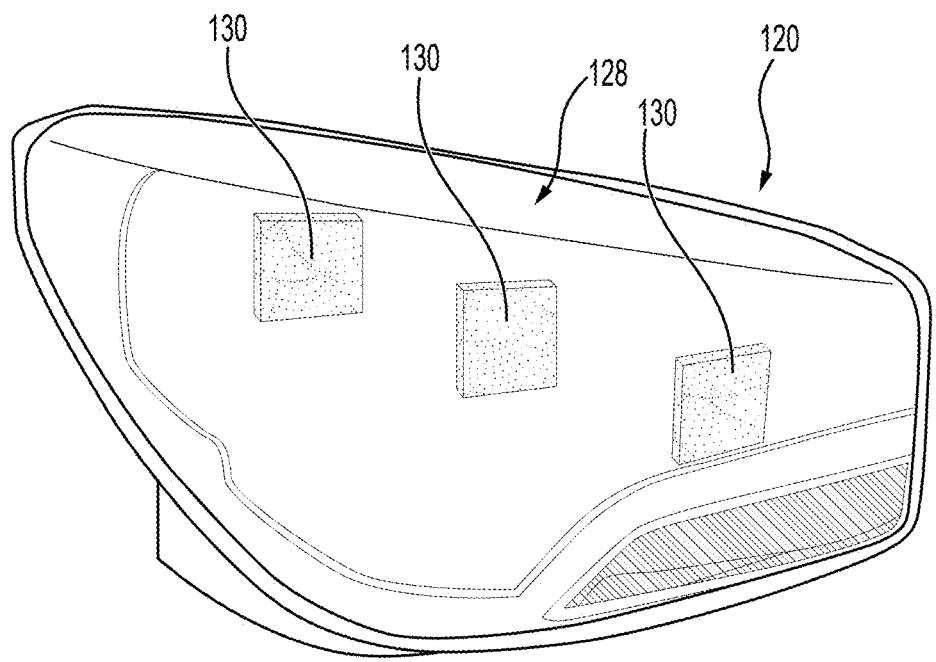
FIG. 12 shows a perspective view of the second lighting assembly.

The second 3D luminescent structure 128 also include a support structure 132 holding a corresponding one of the flat panels 130 at a fixed position. The support structures 132 may appear unilluminated to present an effect wherein the flat panels 130 appear to float in space, as shown in FIG. 12. In some embodiments, the flat panels of the plurality of independent structural elements may be edge lit or back lit by the illumination source 40. For example, the illumination source 40 may be implemented by a lighting assembly with one or more LEDs disposed in each of the support structures 132 for illuminating a corresponding one of the flat panels 130.

Figure 14:
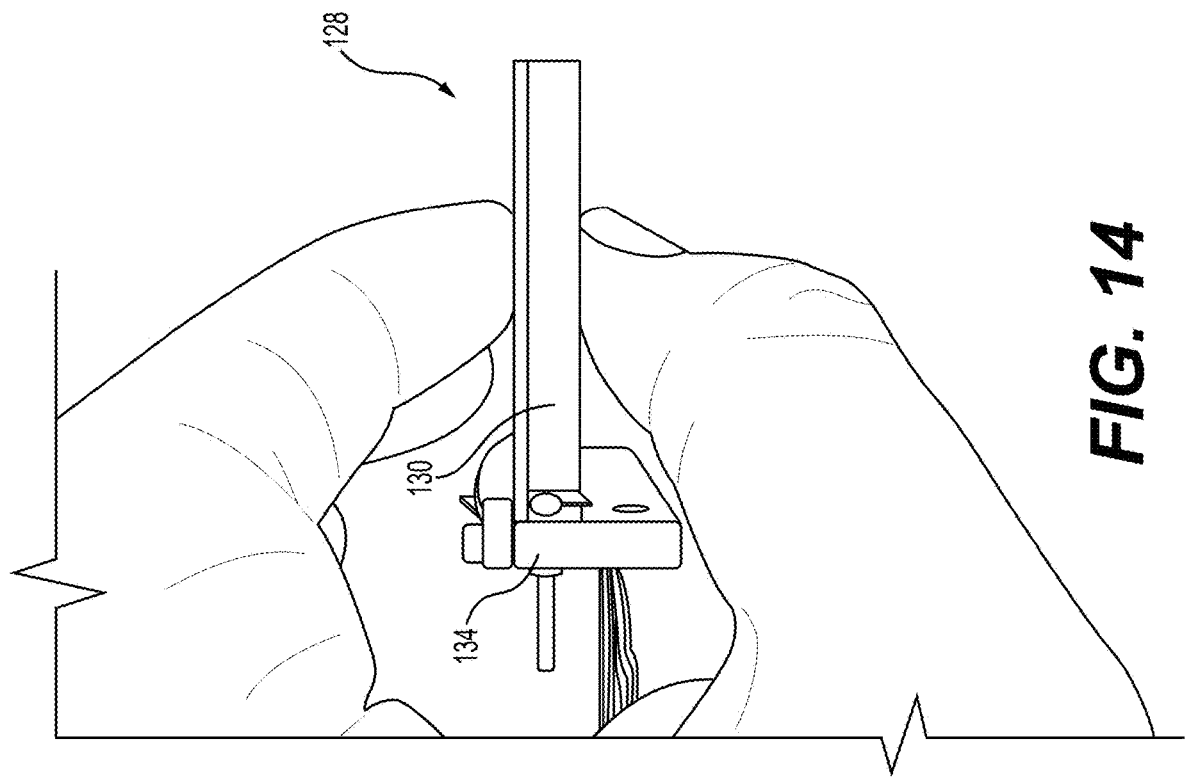
FIG. 14 shows a side view of the second 3D luminescent structure.
Figure 13:
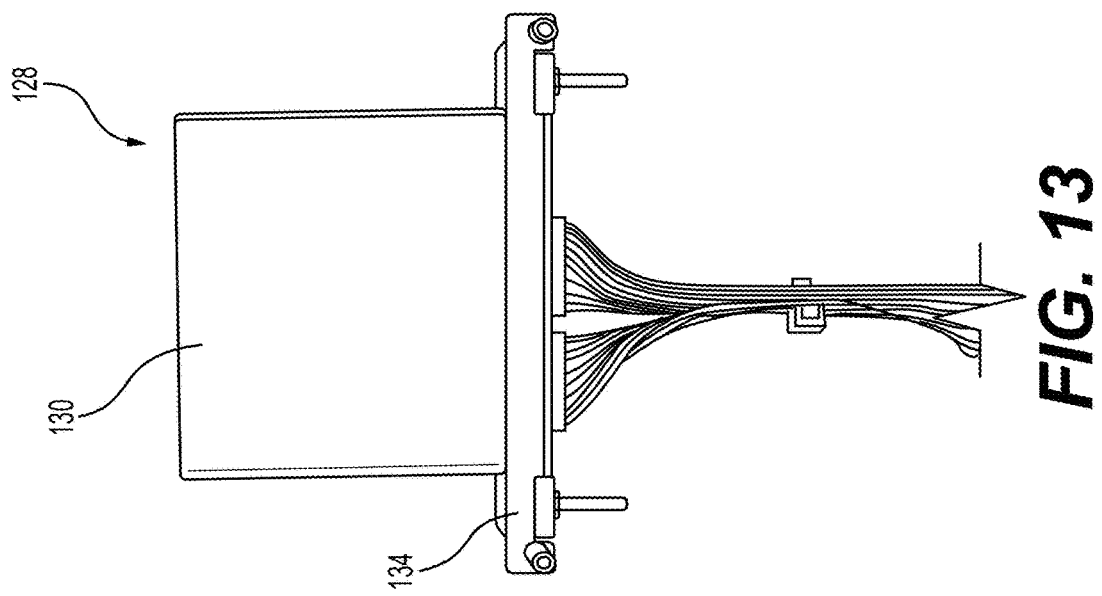
FIG. 13 shows a front view of a second 3D luminescent structure for the second 3D lighting assembly.

FIGS. 13-14 show different views of one of the flat panels 130 of the second 3D luminescent structure 128. The flat panel 130 shown in FIGS. 13-14 is edge lit, as indicated by the wires attached to a lighting assembly 134 that extend along an edge of the flat panel 130. Alternatively or additionally, the flat panels 130 may be back lit by an illumination source.

Figure 15:
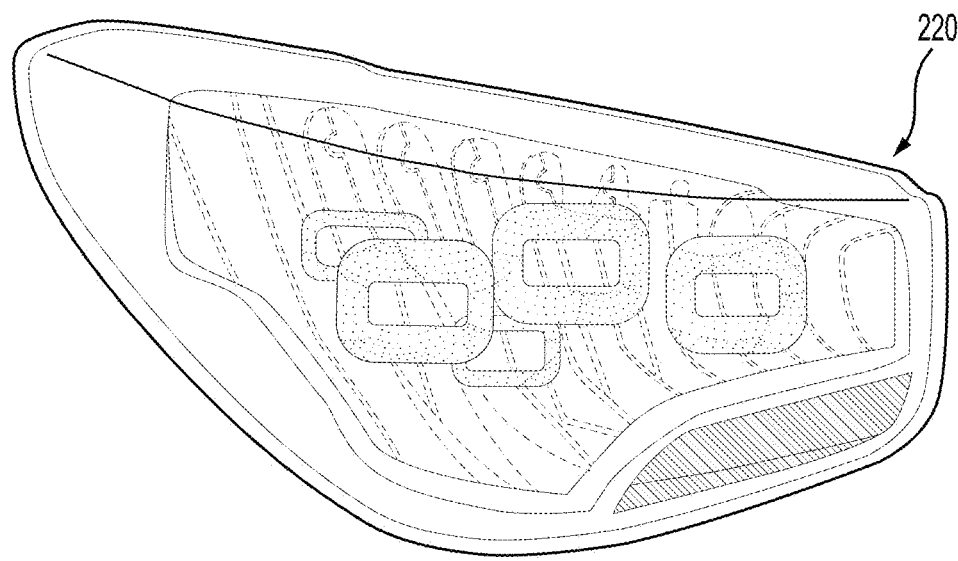
FIG. 15 shows a front view of a third lighting assembly, in accordance with an aspect of the present disclosure.
Figure 16:
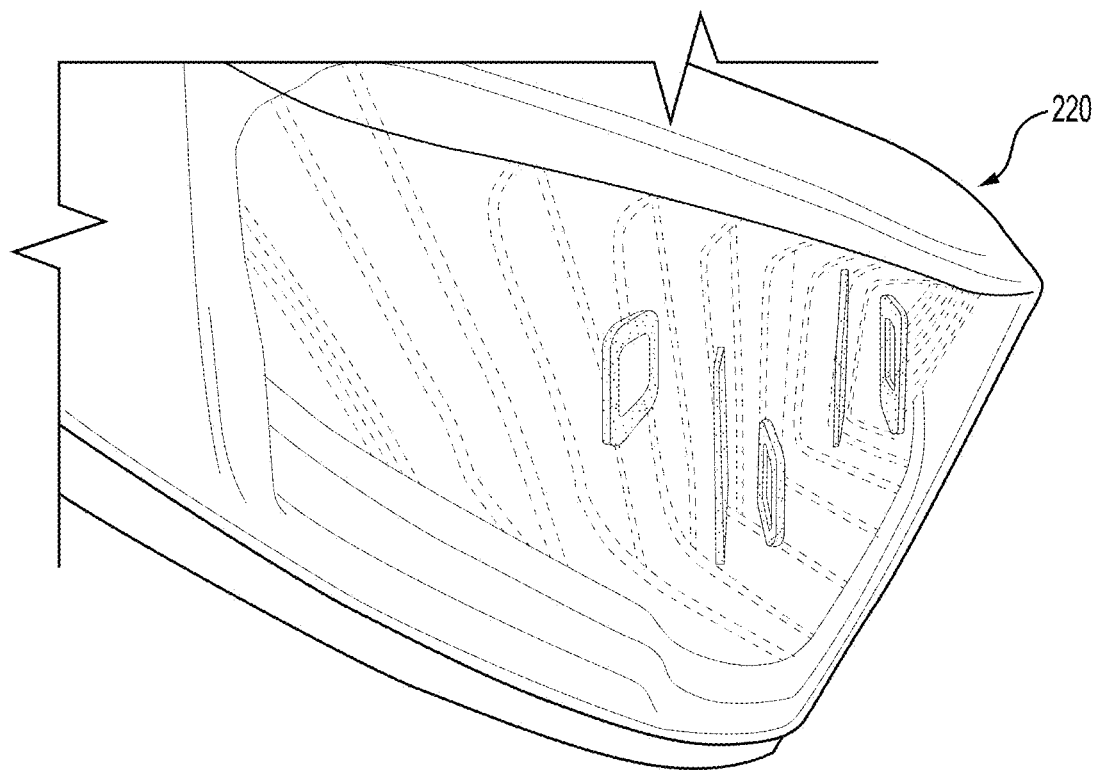
FIG. 16 shows a side view of the third lighting assembly.

FIGS. 15-16 show various views of a third lighting assembly 220. The third lighting assembly 220 may be used as a taillight assembly, and includes relative flat ring-shaped individual lighting elements that illuminate with red light, and which appear to float in space within a chamber of the third lighting assembly 220. As shown in FIGS. 15-16, the individual lighting elements may be very thin, with 3D curves and which appear with very bright illumination, similar to organic light emitting diode (OLED) devices. The individual lighting elements may each appear to have a thickness of not more than 1-2 millimeters. In some embodiments, the individual lighting elements may each appear to have a thickness of less than 1.0 millimeter. In some embodiments, a rear face of the individual lighting elements may include a metallic coating to provide a high reflection, thereby increasing intensity of illumination produced by photoluminescence material, such as q-dots, therein.

FIG. 17 shows a front view of two fourth lighting assemblies 250, which have an elongated panel with an illuminated outline disposed within a chamber thereof. The elongated panel and the illuminated outline may each appear to float independently within a chamber of the fourth lighting assembly 250. FIG. 18 shows a front view of a fifth lighting assembly 270 having a plurality of relatively small 3D structures that each illuminate and which each appear to float independently within a chamber of the fifth lighting assembly 270.

FIGS. 15-18 each also show a ribbed internal structure that defines a back wall of the chamber of each corresponding one of the lighting assemblies 220, 250, 270. One or more of the illumination sources 40 may be located within a structure, such as the ribbed internal structure, which may prevent the illumination sources 40 from being directly visible to an observer.

Figure 19:
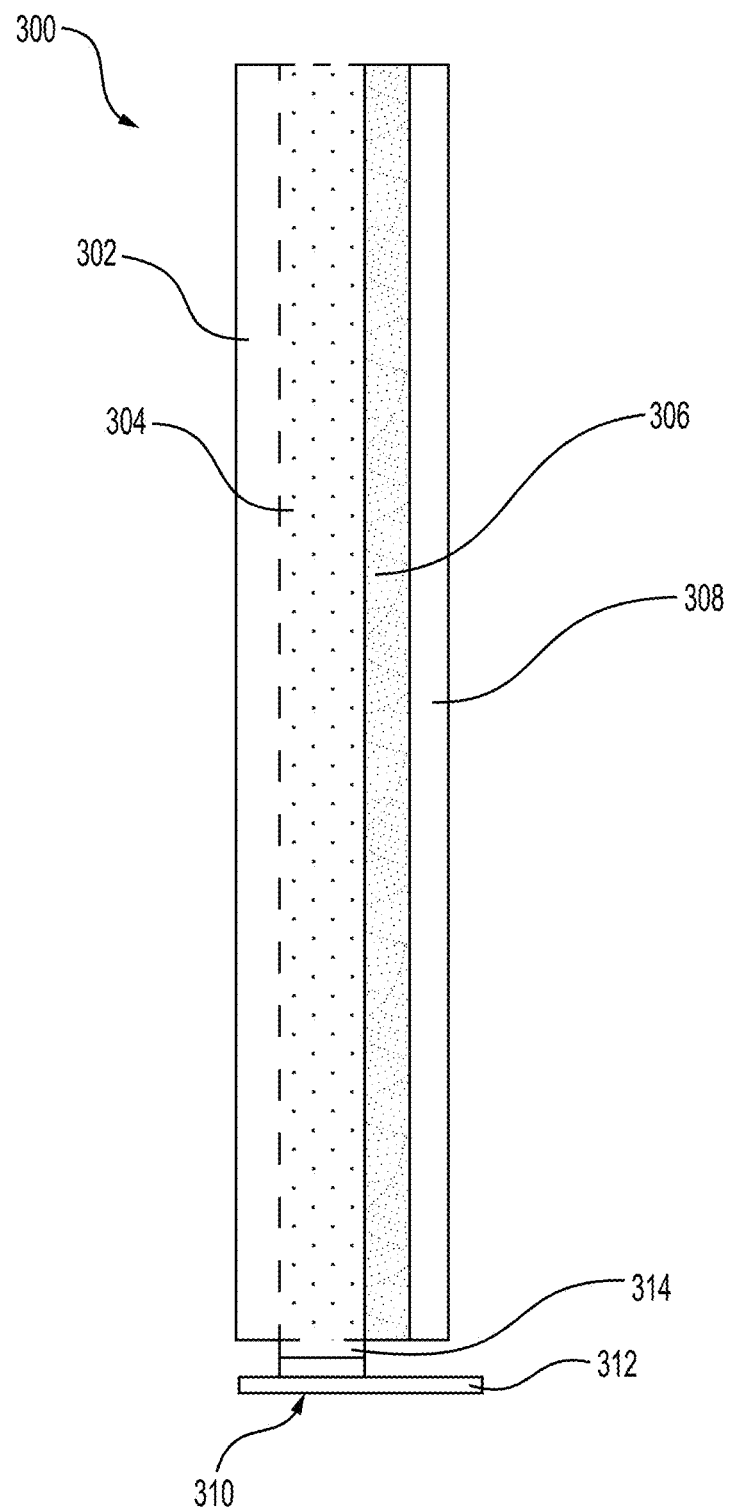
FIG. 19 shows a schematic cut-away diagram showing a side view of a flat panel luminescent structure with edge lighting, in accordance with an aspect of the present disclosure.

FIG. 19 shows a schematic cut-away diagram showing a side view of a first flat panel 300 of a 3D luminescent structure, with edge lighting. The first flat panel 300 includes a stack of layers 302, 304, 306, 308 that extend parallel to one another. The stack of layers 302, 304, 306, 308 includes a standard mirror 302, and a light pipe 304 that overlies the standard mirror 302, immediately adjacent thereto. In some embodiments, the standard mirror 302 may include a substrate and a reflective coating, such as a metalized material. Alternatively or additionally, the standard mirror 302 may be formed by applying a reflective coating on a rear face of the light pipe 304. A q-dot panel 306 includes quantum dots and overlies the light pipe 304, immediately adjacent thereto. The q-dot panel 306 may have a thickness of up to about 3.0 mm. Alternatively, the q-dot panel may have a thickness of 0.5-1.0 mm.

A dichroic mirror 308, which may include a long-pass filter with reflectance, overlies the q-dot panel 306 and is immediately adjacent thereto. A close-pitch blue LED strip 310 is disposed along an edge of the stack of layers 302, 304, 306, 308 and functions as the illumination source 40. The close-pitch blue LED strip 310 includes a circuit board 312 and a plurality of LEDs 314 disposed adjacent to an edge of the first flat panel 300. The LEDs 314 are configured to direct light having a first wavelength, such as blue and/or UV, into the light pipe 304. The light pipe 304 transmits the light from the LEDs to the q-dot panel 306, which is excited by the light from the LEDs to emit visible light and which has a wavelength different from the light having the first wavelength produced by the LEDs 314.

Figure 20:
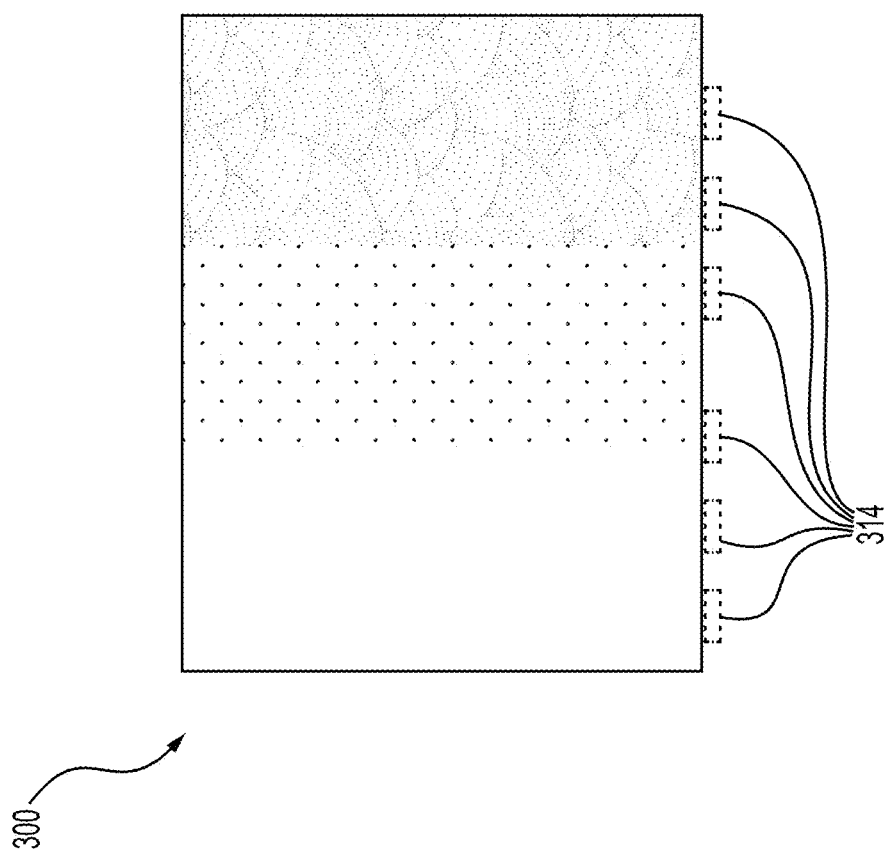
FIG. 20 shows a front view of a 3-D lighting assembly including the flat panel luminescent structure with edge lighting and presenting a fade effect of progressive increasing brightness.

FIG. 20 shows a front view of the first flat panel 300 with edge lighting and presenting a fade effect of progressive increasing brightness. As shown, the edge-mounded LEDs 314 can be separately controlled to cause different portions of the first flat panel 300 to have different levels of illumination. The edge-mounded LEDs 314 may be controlled to cause the first flat panel 300 to present varying different lighting effects or animations.

Figure 21:
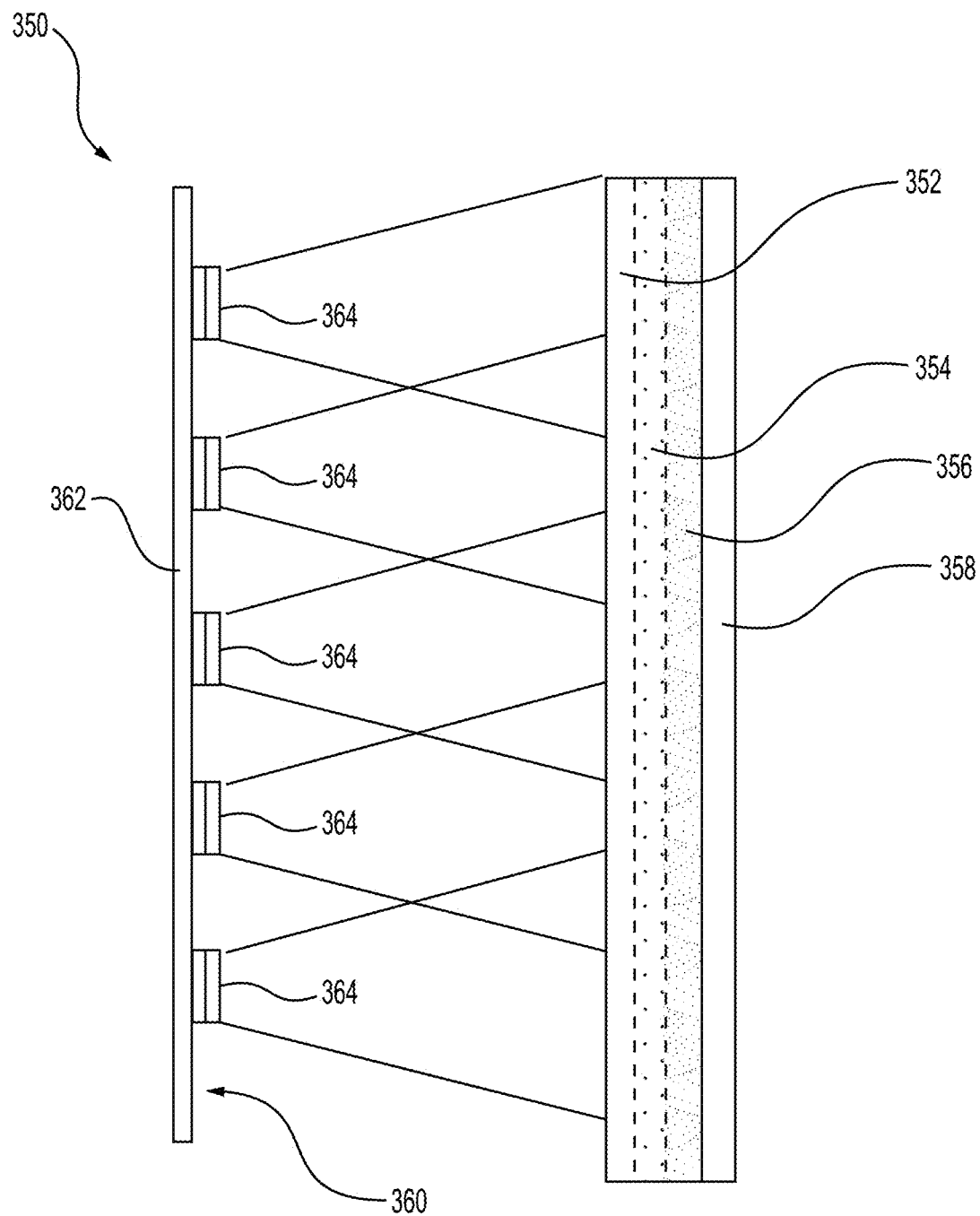
FIG. 21 shows a schematic cut-away diagram showing a side view of a flat panel luminescent structure with back lighting, in accordance with an aspect of the present disclosure.

FIG. 21 shows a schematic cut-away diagram showing a side view of a second flat panel 350 of a 3D luminescent structure, with back lighting. The second flat panel 350 may be implement in a lighting assembly having multiple flood-lit elements with bulk rear lighting, such as a side mirror assembly.

The second flat panel 350 includes a stack of layers 352, 354, 356, 358 that extend parallel to one another. The stack of layers 352, 354, 356, 358 includes a first dichroic mirror 352, and a diffuser 354 that overlies the first dichroic mirror 352, immediately adjacent thereto. The first dichroic mirror 352 may be configured as a short-pass filter to reflect red light. A q-dot panel 356 includes quantum dots and overlies the diffuser 354, immediately adjacent thereto. A second dichroic mirror 358, which may include a long-pass filter with reflectance, overlies the q-dot panel 356 and is immediately adjacent thereto. An LED backlight array 360 is disposed behind the stack of layers 352, 354, 356, 358, spaced apart therefrom and closes to the first dichroic mirror 352. The LED backlight array 360 functions as the illumination source 40 and includes a circuit board 362 and a plurality of LEDs 364. The LEDs 364 are configured to direct light having a first wavelength, such as blue and/or UV, into the first dichroic mirror 352, which transmits the light to the q-dot panel 356, which is excited by the light from the LEDs to emit visible light and which has a wavelength different from the light having the first wavelength produced by the LEDs 364.

Figure 22:
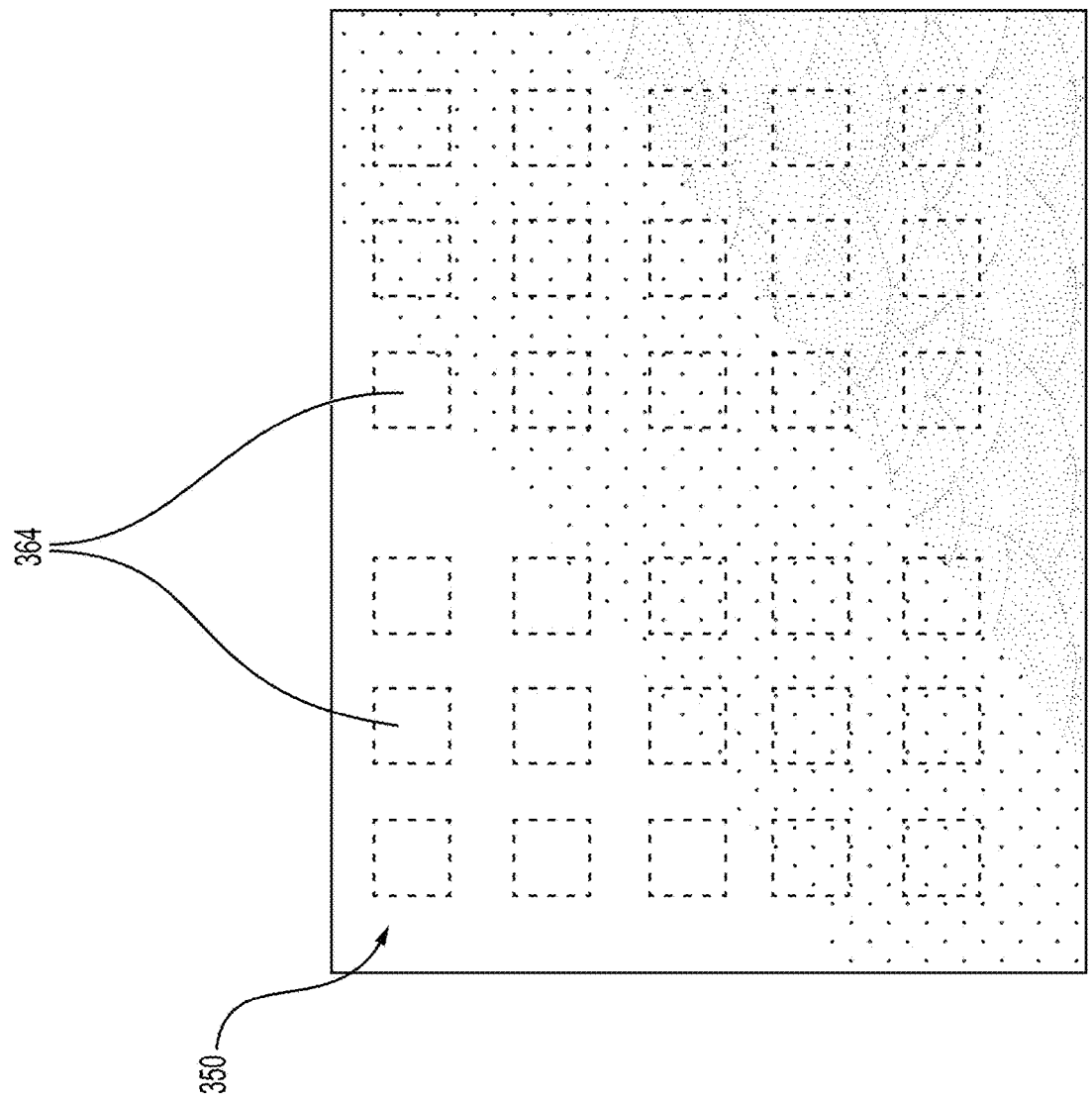
FIG. 22 shows a front view of a lighting assembly including the flat panel luminescent structure with back lighting and presenting a fade effect of progressive increasing brightness.

FIG. 22 shows a front view of second flat panel 350 presenting a fade effect of progressive increasing brightness. As shown, the back-mounted LEDs 364 can be separately controlled to cause different portions of the second flat panel 350 to have different levels of illumination. The back-mounted LEDs 364 may be controlled to cause the second flat panel 350 to present varying different lighting effects or animations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lighting element for a vehicle, comprising:
   a flat panel including a photoluminescence material configured to emit visible light in response to an excitation by light having a wavelength different from the visible light; and
   a support structure holding the flat panel at a fixed position, wherein the support structure appears unilluminated to present an effect wherein the flat panel appears to float in space,
   wherein the flat panel includes a stack of layers extending parallel to one another, the stack of layers including a standard mirror, a light pipe overlying and adjacent to the standard mirror, a q-dot panel including quantum dots and overlying the light pipe, and a dichroic mirror overlying the q-dot panel.

2. The lighting element of claim 1, wherein the light having the wavelength different from the visible light includes ultraviolet light.

3. The lighting element of claim 1, wherein the photoluminescence material includes a quantum dot doped substrate.

4. The lighting element of claim 1, further including an LED disposed adjacent to an edge of the flat panel and configured to direct the light having the wavelength different from the visible light into the light pipe.

5. The lighting element of claim 1, wherein the flat panel includes a stack of layers extending parallel to one another, the stack of layers including a first dichroic mirror, a q-dot panel including quantum dots and overlying the first dichroic mirror, and a second dichroic mirror overlying the q-dot panel.

6. The lighting element of claim 5, further including a plurality of LEDs disposed behind the first dichroic mirror and configured to backlight the flat panel with the light having the wavelength different from the visible light.

7. The lighting element of claim 1, wherein the second dichroic mirror overlies an entire surface of the q-dot panel.

8. The lighting element of claim 1, wherein the standard mirror includes a substrate and a reflective coating.

9. The lighting element of claim 1, wherein the standard mirror includes a reflective coating on a rear face of the light pipe, opposite of the q-dot panel.

\* \* \* \* \*